(No Model.)

A. W. ROUTH.
STREET CAR FENDER.

No. 601,046. Patented Mar. 22, 1898.

Witnesses

Inventor
A. W. Routh.
by Henry C. Evert.
Attorney

THE NORRIS PETERS CO., PHOTO-LITHO., WASHINGTON, D. C.

UNITED STATES PATENT OFFICE.

ALBERT W. ROUTH, OF PITTSBURG, PENNSYLVANIA.

STREET-CAR FENDER.

SPECIFICATION forming part of Letters Patent No. 601,046, dated March 22, 1898.

Application filed September 25, 1897. Serial No. 652,999. (No model.)

*To all whom it may concern:*

Be it known that I, ALBERT W. ROUTH, a citizen of the United States of America, residing at Pittsburg, in the county of Allegheny and State of Pennsylvania, have invented certain new and useful Improvements in Street-Car Fenders, of which the following is a specification, reference being had therein to the accompanying drawings.

This invention relates to certain new and useful improvements in car-fenders, and has for its object to construct a fender particularly designed for use on street-cars.

The principal features of my invention reside in the novel construction and arrangement, whereby the fender when lowered into engagement with the track will automatically operate a roller journaled in the front of the fender, which engages the object and either causes the same to be elevated up onto the fender or pushed in front of same, so as to effectually prevent the object from passing underneath the fender and into contact with the wheels of the truck.

The invention also aims to provide novel means for holding the fender firmly in engagement with the track when lowered and for folding the same so as to permit the storing of the cars or the coupling of the same together.

The invention will be hereinafter more fully described and specifically pointed out by reference to the accompanying drawings, in which like letters of reference indicate similar parts throughout the several views, in which—

Figure 1:
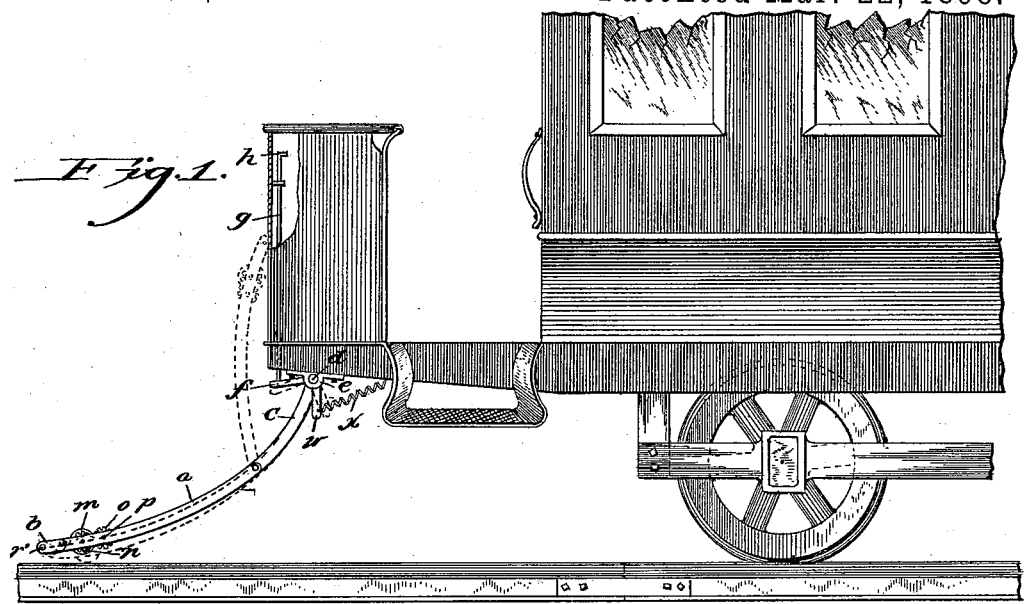
Figure 5:
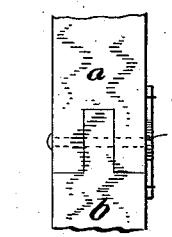
Figure 4:
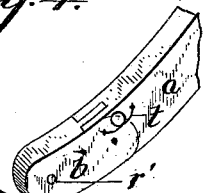
Figure 6:
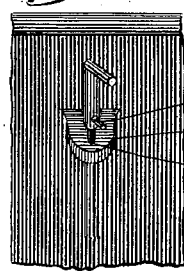
Figure 3:
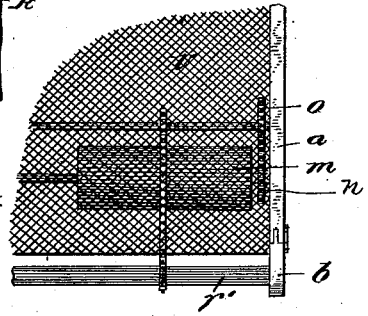
Figure 2:
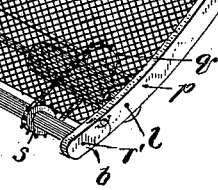

Figure 1 is a side view of a portion of a car with my improved fender in position. Fig. 2 is a perspective view of the fender with the side braces partly broken away. Fig. 3 is a top plan view of a portion of the fender. Fig. 4 is a perspective view of a portion of one of the side bars. Fig. 5 is a top plan view of the same. Fig. 6 is a side view of a portion of the front of the car, showing a detail perspective view of manner in which the fender is normally supported from the truck.

Referring now to the drawings by reference-letters, the side bars are formed in three pieces $a$, $b$, and $c$, which are joined together by means of groove and tenon and pinned, and each being slightly curved, so that when in position the side bars will be segmental in form in order to give the proper scoop to the fender. The rear portion $c$ of these side braces is attached to the cross-rod $d$, which is journaled in bearings $e$, secured to the underneath side of the car-body, and the bars $c$ being rigidly attached to the rod the fender is operated by means of a lever $f$, secured centrally on said rod and having attached thereto a vertically-operating lever $g$, passing upward at the front of the car-platform and formed on its upper end with a handle $h$. The operating rod or lever $g$ is retained, so as to hold the fender in the elevated position, by means of a lug $k$, secured on the platform, shield, or dashboard, the slot $k'$ through said lug being elongated to permit the passage of the pin $k^2$, and when the operating rod or lever is turned slightly this pin $k^2$ will rest on the top of the lug $k$.

Near the forward end of the portion $a$ of the side bars is journaled a shaft $l$, which has mounted thereon rollers $m$, composed of india-rubber or other flexible material, said shaft also having gear-wheels $n$, mounted thereon between the outer ends of the rollers $m$ and the side bars $a$. These gear-wheels $n$ mesh with gear-wheels $o$, which are mounted upon a rod or shaft $p$, journaled in the side bars $a$ at the rear of the shaft $l$. This shaft or rod $p$ also carries sprocket-wheels $q$ to receive a chain and passing over the same and the sprocket-wheels $s$, that are mounted upon a shaft $r'$, which is journaled in the bars $b$. These portions $b$ are held normally in alinement with the portions $a$ by means of springs $t$, attached to the said portions at the joint of the same.

Near the joint of the portions $a$ and $c$ a brace $u$ extends across from the bars on one side to those of the opposite side, which serves to stiffen the fender and also serves to form a fastening for the netting $v$, with which the fender is supplied.

Levers $w$ are attached to the cross-rod carrying the fender, and to these levers is attached one end of the spring $x$, the other end being attached at any suitable point to the car-body and serving to hold the fender in engagement with the track when the same is lowered.

Operation: When the vertical lever $g$ has been turned so as to permit the pin $k^2$ to pass through the slot $k'$, the fender will be released from its elevated position, and when lowered the rollers $m$, coming in contact with the bed of the track, serve to revolve the shaft $l$, causing the gear-wheels $n$ to operate the gear-wheels $o$ and revolve the shaft $p$, so as to communicate motion through the sprocket-chains $r$ to the roller $r'$, turning this roller in the direction of the fender and serving to either carry an object before or up onto the fender, thus absolutely preventing the object from passing underneath the fender into contact with the wheels.

The manner in which the fender may be folded when it is desired to store the cars or to couple two cars together is fully illustrated in dotted lines in Fig. 1 of the drawings, and any detailed description is deemed unnecessary.

It will be noted that various changes may be made in the details of construction without departing from the general spirit of my invention.

Having fully described my invention, what I claim as new, and desire to secure by Letters Patent, is—

In a car-fender the side bars formed in sections, a suitable netting attached thereto, shafts $l$, $p$ and $r'$ journaled in said side bars, rollers mounted on shaft $l$, gear-wheels mounted on shafts $l$ and $p$, said gear-wheels meshing with each other, sprocket-wheels mounted on shafts $p$ and $r'$, a sprocket-chain engaging said sprocket-wheels whereby motion is communicated to shaft $r'$ when the rollers come in contact with the track, operating-levers for raising and lowering the fender and means for holding the fender in engagement with the track when lowered, substantially as shown and described.

In testimony whereof I affix my signature in presence of two witnesses.

ALBERT W. ROUTH.

Witnesses:
JOHN NOLAND,
THOS. M. BOYD, Jr.